(12) United States Patent
Bertz et al.

(10) Patent No.: US 11,128,540 B1
(45) Date of Patent: Sep. 21, 2021

(54) AUGMENTED REALITY ELECTRONIC EQUIPMENT MAINTENANCE USER INTERFACE

(71) Applicant: Sprint Communications Company L.P., Overland Park, KS (US)

(72) Inventors: Lyle T. Bertz, Lee's Summit, MO (US); Laurent A. Laporte, Spring Hill, KS (US); Brandt D. Sanders, Overland Park, KS (US); Joao Teixeira, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/789,948

(22) Filed: Feb. 13, 2020

(51) Int. Cl.
*H04L 12/24* (2006.01)
*G06K 19/06* (2006.01)
*H04L 29/06* (2006.01)
*H04L 29/08* (2006.01)
*G06K 19/07* (2006.01)

(52) U.S. Cl.
CPC ...... *H04L 41/145* (2013.01); *G06K 19/06028* (2013.01); *G06K 19/06037* (2013.01); *G06K 19/0723* (2013.01); *H04L 41/06* (2013.01); *H04L 67/36* (2013.01); *H04L 67/42* (2013.01)

(58) Field of Classification Search
CPC ....... H04L 67/12; H04L 41/06; H04L 41/145; H04L 67/42; G06Q 10/10; G06Q 10/06; G06Q 10/08; G06Q 10/087; G06K 7/0004; G06K 7/10732; G06K 7/1473; G06K 19/06037; G06K 19/0723
See application file for complete search history.

(56) References Cited

U.S. PATENT DOCUMENTS

| | | | | |
|---|---|---|---|---|
| 7,370,102 B1* | 5/2008 | Chu | ..................... | G06F 11/0709 709/223 |
| 2004/0236547 A1* | 11/2004 | Rappaport | ............ | H04W 16/20 703/2 |
| 2016/0253563 A1* | 9/2016 | Lam | ..................... | G06F 11/0748 348/130 |
| 2018/0287907 A1* | 10/2018 | Kulshreshtha | ........ | H04L 41/064 |
| 2018/0341956 A1* | 11/2018 | Everhart | ............... | G06F 16/958 |
| 2020/0250863 A1* | 8/2020 | Shetty | ..................... | G06T 11/20 |
| 2020/0387127 A1* | 12/2020 | McGill | .............. | G06K 9/00671 |

* cited by examiner

*Primary Examiner* — Douglas B Blair
*Assistant Examiner* — Rachel J Hackenberg (57) ABSTRACT

A method for maintaining server computers. The method comprises capturing a signature of one of a plurality of server computers by an augmented user interface (AUI) maintenance client application executing on a mobile communication device, transmitting the signature by the AUI maintenance client application to an AUI maintenance server application executing on a computer, looking up information on the server computer associated with the signature by the AUI maintenance server application based on the signature, wherein the information identifies a process executing on the server computer, identifies an alarm active on the server computer, and identifies a recommended maintenance action, transmitting the looked up information by the AUI maintenance server to the AUI maintenance client application, and presenting the information on a display of the mobile communication device, whereby maintenance of the server computer is assisted.

20 Claims, 5 Drawing Sheets

FIG. 5 ary sandtity implementations of one or more embodiments are
AUGMENTED REALITY ELECTRONIC EQUIPMENT MAINTENANCE USER INTERFACE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data centers may comprise thousands of server computers disposed of several server blades per equipment rack, several racks per equipment cabinet, several equipment racks per row, and many, many rows per data center. A variety of maintenance activities are desirably performed to keep a data center operating efficiently. Some maintenance activities can be performed remotely, for example from a control workstation located in an operations center at the data center or possibly in a network operation center (NOC) in a central location separate from the data center. Other maintenance activities may be performed by technicians physically in the data center, physically at the location of the server computer or server blade that is the object of a maintenance operation.

SUMMARY

In an embodiment, a method for maintaining a data center is disclosed. The method comprises collecting data on each of a plurality of server computers located in a data center by a data collection process executing on each server computer, transmitting the collected data periodically by each data collection process to a data store, analyzing the collected data stored in the data store by an agent to produce performance metrics for each of the different server computers, and capturing a signature of one of the plurality of server computers by an augmented user interface (AUI) maintenance client application executing on a mobile communication device. The method further comprises transmitting the signature by the AUI maintenance client application to an AUI maintenance server application executing on a server computer, identifying one of the plurality of server computers by the AUI maintenance server application based on the signature, looking up performance metrics for the identified server computer by the AUI maintenance server application, transmitting the performance metrics for the identified server computer by the AUI maintenance server to the AUI maintenance client application, and presenting the performance metrics on a display of the mobile communication device, whereby maintenance of the data center is performed.

In another embodiment, a method for maintaining server computers is disclosed. The method comprises analyzing data collected from each of a plurality of server computers by an agent executing on a first computer to produce performance metrics for each of the server computers, capturing a signature of one of the plurality of server computers by an augmented user interface (AUI) maintenance client application executing on a mobile communication device, and transmitting the signature by the AUI maintenance client application to an AUI maintenance server application executing on a second computer. The method further comprises looking up performance metrics for the server computer associated with the signature by the AUI maintenance server application based on the signature, transmitting the looked up performance metrics and information about a process executing on the server computer associated with the signature by the AUI maintenance server to the AUI maintenance client application, and presenting the performance metrics and information about the process executing on the server computer associated with the signature on a display of the mobile communication device.

In yet another embodiment, a method for maintaining server computers is disclosed. The method comprises capturing a signature of one of a plurality of server computers by an augmented user interface (AUI) maintenance client application executing on a mobile communication device, transmitting the signature by the AUI maintenance client application to an AUI maintenance server application executing on a computer, and looking up information on the server computer associated with the signature by the AUI maintenance server application based on the signature, wherein the information identifies a process executing on the server computer, identifies an alarm active on the server computer, and identifies a recommended maintenance action. The method further comprises transmitting the information looked up on the server computer associated with the signature by the AUI maintenance server to the AUI maintenance client application and presenting the information about the server computer associated with the signature on a display of the mobile communication device, whereby maintenance of the server computer is assisted.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches an augmented reality electronic equipment maintenance user interface (AUI) that promotes improved maintenance of electronic equipment. A mobile communication device, such as an AUI client application executing on a tablet computer, scans an indicia or identifying signature affixed to an item of electronic equipment and transmits a message comprising an electronic representation of the signature to an AUI server application. The AUI server application identifies the item of electronic equipment based on the signature and looks up relevant information about that item of electronic equipment. For example, in an embodiment, a data structure is stored in a data store that provides a mapping between electronic representations of different signatures to associated identities of servers, and the AUI server application looks up the server identity based on the signature sent to it by the AUI client application. The AUI server application may then search in one or more other data structures and/or data stores to collect information about the server based on using the server identity as an index into those data structures and/or data stores.

The AUI server transmits the relevant information back to the AUI client application on the mobile communication device, and the AUI client application presents the relevant information on a user interface (UI) of the mobile communication device. The relevant information can identify the equipment, identify what functions the equipment is performing, what may need repair in the equipment, and optionally suggest explicit repair procedures. A maintenance technician using the device may then perform maintenance on the equipment based on the information presented on the UI. This AUI system can create a more efficient workplace for technicians and engineers responsible for maintaining electronic equipment and can provide a more efficient electronic equipment operating environment, for example a more efficient communication network.

In some electronic equipment operating environments there may be a large number of like equipment items, and it may be a challenge for a maintenance technician to locate a specific equipment item, for example a malfunctioning item of equipment he or she has been dispatched to repair or maintain. For example, data centers may comprise hundreds or even thousands of very similar server computers. The AUI client application can help a maintenance technician locate and confirm the identity of a sought after item of electronic equipment, based on scanning the signature of the equipment. First, the AUI client application can help the maintenance technician to find the location of the server by identifying a section of a server room, identifying a row of racks in the section, and a rack in the row. This may be supported by an inventory map and locating functional software in the AUI server. The inventory map may be a digital representation of locations of server inventory within the server room, for example in terms of a rack identity, a row identity, a section identity, and other hierarchical location identity. The AUI server may send presentation information to the AUI client application commanding it to present a display of a map of the server room that indicates a path to the server of interest. The AUI server may be able to automatically locate the maintenance technician within the server room (e.g., locating the mobile communication device executing the AUI client application by using wireless beaconing functionality or other locating technology). As the maintenance technician approaches the server of interest, the AUI server may send presentation information to the AUI client application commanding it to present more precise and local locating maps for use by the maintenance technician. During this process, the AUI server is continuing to analyze the changing location of the maintenance technician (e.g., the automatically determined location of the technician's mobile communication device) and updating the path presented on the AUI client display.

The AUI client can scan an indicia or signature affixed to the front of the server and/or in the front of the rack the server is mounted in. In an embodiment the indicia or signature may be a bar code, a two dimensional bar code, a quick response (QR) code, a textual label, or another graphical signature. In an embodiment, the indicia or signature may be a radio frequency identity (RFID) chip. In an embodiment, the indicia or signature may be a radio beacon. When the maintenance technician is standing in front of an item of equipment he or she thinks is the equipment to be maintained, he or she may scan the signature affixed to the equipment, and the AUI client application, through the interaction with the AUI server application described above, can provide a positive identification of the equipment.

In an embodiment, the AUI client application may promote the maintenance technician selecting a control to project an image on the display of the mobile communication device showing a configuration of record of the item of equipment—for example representing cabling connections to the equipment, representing configuration switch positions. In response to activation of the input, the AUI client application can request information on the configuration of record of the equipment from the AUI server application. The AUI server application can look up the configuration of record in a data store using the identity of the equipment as an index and provide this configuration of record information to the AUI client application. The AUI client application can then present the image of the configuration of record.

In an embodiment, the mobile communication device may capture a live image of the actual equipment, present that image on the display, and the AUI client application may overlay a transparent image of the configuration of record over the live image of the actual equipment, promoting the maintenance technician easily comparing the configuration of record with the actual configuration. This may, for example, promote identifying a configuration switch set in the wrong position, a cable installed into the wrong port, or a cable that has become disconnected. In some contexts the overlaid image may be referred to as an augmented reality image. Installing a cable into a wrong port may result in causing processing of data received from the cable at an unnecessarily slow rate, for example when the port is configured for a slow rate.

In a data center environment, each server may execute a monitor application that captures performance metrics of the server and periodically reports them back to a data store. An agent executing on a server in the data center analyzes the performance metrics to determine norms of performance and to compare current performance to those norms. When predefined performance thresholds are exceeded, the agent may generate an alarm that captures information such as the identity of the server associated with the alarm, a norm, a threshold, and one or more performance metric values. The alarms and the other results produced by the agent may themselves be stored in the data store. The AUI server application can select information from this data store using the identity of a server that the AUI client application has scanned (e.g., the AUI client application has scanned the signature associated with that server) and send that information to the AUI client application. The AUI server application can also look up information on processes executing on the server identified by a signature and transmit that information to the AUI client application. The AUI client application can present alarm information, performance information, and identification of processes executing on the server computer on the display of the mobile communication device. The AUI client application can present a list of repair options that the user may initiate manually or select to initiate an automated repair action.

The AUI system may be applied to data centers, to cell sites (e.g., cell towers), and to other electronic equipment. The AUI client application may be installed in a variety of mobile communication devices. In an embodiment, the AUI client application may be installed in a mobile communication device suitable for attaching to a hard hat worn by a maintenance technician or an engineer. In an embodiment, the AUI system may be applied in a core network of a wireless communication service provider. In an embodiment, the AUI system may be applied in a public cloud computing environment. In an embodiment, the AUI system may be applied in a private cloud computing environment.

Figure 1:
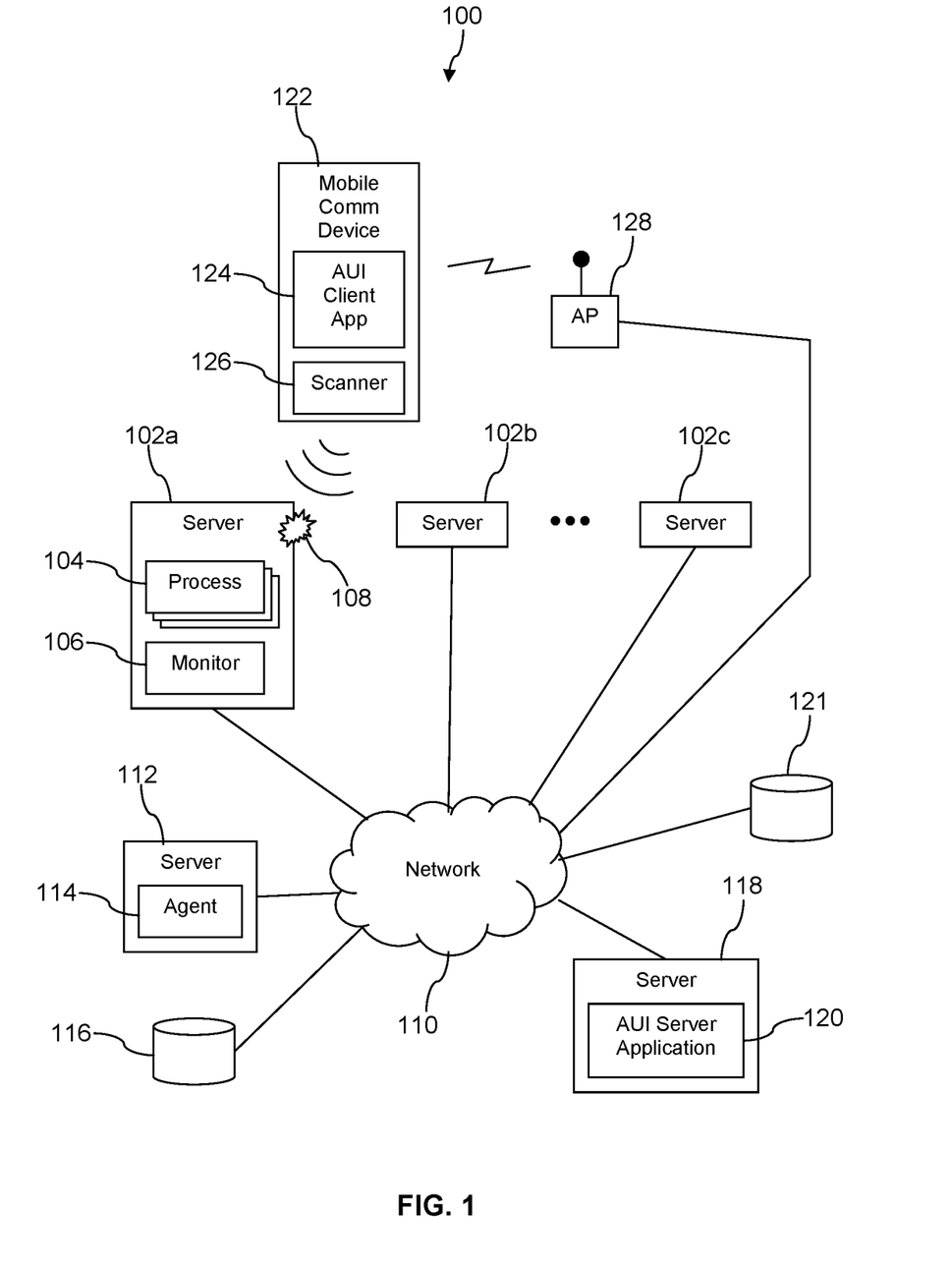
FIG. 1 is a block diagram of a computer system according to an embodiment of the disclosure.

Turning now to FIG. 1, a system 100 is described. In an embodiment, the system 100 comprises a plurality of server computers 102, for example a first server 102a, a second server 102b, and a third server 102c. Each server 102 executes one or more processes 104 and a monitor application 106. The processes 104 may be different on different servers 102, but every server 102 executes the monitor application 106 that is substantially the same from server to server. A signature 108 is associated with each server 102—a different signature 108 for each different server 102. In an embodiment, the system 100 comprises other electronic equipment in addition to or in place of servers 102. For example, in an embodiment, the system 100 comprises a cell site having an equipment closet at ground level housing a plurality of equipment chassis, each chassis comprising multiple circuit boards that each are associated with signatures 108 as well as a remote radio head (RRH) mounted on top of a mast or tower, where the RRH comprises one or more equipment boxes or chassis which may comprise one or more circuit boards each associated with signatures 108.

The signature 108 may be a graphical signature such as a bar code, a 2-dimensional bar code, a quick response (QR) code, or other graphical indicia. The signature 108 may be a radio frequency identity (RFID) chip. The signature 108 may be a radio beacon. The signature 108 may be a textual label. Some servers 102 may have signatures 108 of a different technological type. For example, the first server 102a may have a signature 108 that is a QR code, the second server 102b may have a signature 108 that is an RFID chip, and the third server 102c may have a signature 108 that is a radio beacon. In an embodiment, servers 102 may have more than one signature 108, for example a first signature 108 on a front of the server 102 and a second signature 108 on a back of the server 102. In an embodiment, the signature 108 is an appearance of the server 102, for example an appearance in a rack and the rack may have a distinctive identification. Said in other words, the signature 108 of a server 102 may be the combination of a signature of an equipment cabinet, a rack position in the equipment cabinet, and a server board position in the rack.

Each of the servers 102 is communicatively coupled to a network 110. The servers 102 may be server computers in a data center. The processes 104 may be virtual machines, and other processes may execute within the virtual machines. Alternatively, the servers 102 may execute virtual machines, and the processes 104 may execute in the execution environment provided by the virtual machines. Alternatively, the processes 104 may execute in a traditional execution environment provided by an operating system (OS) executing on the servers 102. The network 110 comprises one or more private networks, one or more public networks, or a combination thereof. The network 110 may comprise the Internet.

The system 100 further comprises a first computer system 112 that executes an agent application 114, a first data store 116, a second computer system 118 that executes an augmented reality electronic equipment maintenance user interface (AUI) server application 120, and a second data store 121. The system 100 further comprises a mobile communication device 122 that executes an AUI client application 124 and comprises a signature scanner 126. The system 100 further comprises a wireless access point (AP) 128. The first computer system 112, the first data store 116, the second computer system 118, the second data store 121, and the wireless AP 128 are communicatively coupled to the network 110.

The mobile communication device 122 is configured to establish a wireless communication link with the wireless AP 128 which in turn communicatively couples the device 122 to the network 110. In an embodiment, the wireless AP 128 communicates with the mobile communication device 122 using WiFi. The mobile communication device 122 may be a tablet computer, a notebook computer, a laptop computer, a mobile phone, a personal digital assistant (PDA), a smart phone, a wearable computer, or a headset computer. In an embodiment, the mobile communication device 122 is configured to be attached to, secured to, or suspended from a hat such as a hard hat. The mobile communication device 122 may have a keypad input device, a touchscreen input device, and/or a voice recognition input device to allow a human being to interact with the mobile communication device 122.

While three servers 102a, 102b, 102c are illustrated in FIG. 1, it is understood that the system 100 may comprise any number of servers 102—for example hundreds of servers 102, thousands of servers 102, or more. While one mobile communication device 122 is illustrated in FIG. 1, it is understood that the system 100 may comprise any number of mobile communication devices 122. While a single wireless AP 128 is illustrated in FIG. 1, it is understood that the system 100 may comprise any number of wireless APs 128. Additionally, while FIG. 1 illustrates the electronic equipment that are the object of the AUI client application 124 and the AUI server application 120 to be server computers 102, it is understood that other electronic equipment environments, such as cell sites, may advantageously apply the teachings of the present disclosure with only minor adaptation of the descriptions herein.

The monitor application 106 on each server 102 monitors processes and data communications and periodically reports performance metrics to the first data store 116, for example every minute, every two minutes, every five minutes, every ten minutes, or some other periodic interval. The reports may comprise information on the performance of the processes 104 as well as on the server computer 102 itself. In an embodiment, the monitor application 106 is a daemon process that executes periodically on the server 102. In an embodiment, the monitor application 106 is a collected application. The agent application 114 may analyze the performance metrics stored in the first data store 116 by the monitor application 106 to produce norms and averages of performance of the servers 102. The agent application 114 may further determine if the performance metrics exceed some alarm thresholds and produce alarm events when this occurs. The norms, averages, and alarms generated by the agent application 114 may be stored in the first data store 116.

The mobile communication device 122 can use the signature scanner 126 to scan or capture the signature 108 of a server 102. For example, a maintenance technician in a data center may be dispatched to perform a maintenance action on a server 102. The technician may think he or she has located the correct server 102. The technician wields the mobile communication device 122 to scan the signature 108 with the signature scanner 126. The signature scanner 126 may be a digital camera. The signature scanner 126 may be a near field communication receiver. The signature scanner 126 may be an RFID receiver. In an embodiment, the mobile communication device 122 may comprise a plurality of signature scanners 126 where each different signature scanner 126 is associated with a different scanning technology, allowing the mobile communication device 122 to interwork with servers 102 having different types of signatures 108.

The AUI client application 124 sends an electronic representation of the signature 108 back to the AUI server application 120. The AUI server application 120 uses the electronic representation of the signature 108 to index into the second data store 121 that stores a mapping of signatures 108 to identities of servers 102. The AUI server application 120 returns this server identification to the AUI client application 124. The AUI client application 124 can present the server identity on a display of the mobile communication device 122, and the maintenance technician can verify whether he or she has located the correct server 102. If the identity of the server 102 associated with the signature 108 is not the identity of the server 102 the maintenance technician was dispatched to maintain, the technician may scan the signature 108 of a different server 102 and repeat this process until the sought for server 102 is found and its identity confirmed via the AUI client application 124. In an embodiment, the mobile communication device 122 may store a map of signatures 108 indexed to identities of servers 102, and the AUI client application 124 may autonomously look up the identity of the server 102 associated with the signature 108 and present this on the display of the mobile communication device 122.

The AUI server application 120 can further look up additional information about the server 102 based on its identity. The AUI server application 120 can look up information about the hardware and software configuration of the server 102 in the second data store 121 and return that information to the AUI client application 124. This information can identify the processes 104 executing on the server 102 and indicate a state of the processes 104. The AUI server application 120 can look up performance metrics and alarms associated with the server 102 in the first data store 116 and return these to the AUI client application 124. The AUI client application 124 can present this information on a display of the mobile communication device 122. The AUI server application 120 can look up what is in need of repair and one or more remedial actions associated with the repair and send this information to the AUI client application 124. In an embodiment, the AUI server application 120 may send an application programming interface (API) method to invoke an automated repair action to the AUI client application 124, and the AUI client application 124 may invoke the API method to launch the automated repair action, for example on the event of a maintenance technician actuating a control input presented on a display of the mobile communication device 122. In an embodiment, an artificial intelligence (AI) system (not shown) may operate in the system 100 that automatically initiates maintenance actions to repair failures and/or to address alarms. The AUI server application 120 may identify any AI maintenance operations in-progress on the server 102 that the mobile AUI client application 124 is presenting information about and send that information about in-progress AI maintenance to the AUI client application 124 for presentation on the mobile communication device 122.

In an embodiment, the monitor applications 106 publish their performance reports and performance metrics to a publish-subscribe message bus system, for example to a Kafka message bus. The agent 114 subscribes to topics associated with the performance reports and performance metrics on the message bus system. In an embodiment, a first agent subscribes to topics on the message bus system and stores the data in the first data store 116, while a second agent analyzes and processes the data after it is stored in the first data store 116. This structure of two separate agents may promote maintainability and extensibility of the system. In an embodiment, the AUI server application 120 may subscribe to a specific topic associated with a server 102 identified by the AUI client application 124. It is understood that multiple mobile communication devices 122 each executing an instance of the AUI client application 124 may be requesting services from the AUI server application 120 concurrently. Thus, the AUI server application 120 may be monitoring and/or subscribing to topics associated with different servers 102 at the same time and sending relevant information associated with different servers 102 to the different AUI client applications 124 accordingly.

Figure 2:
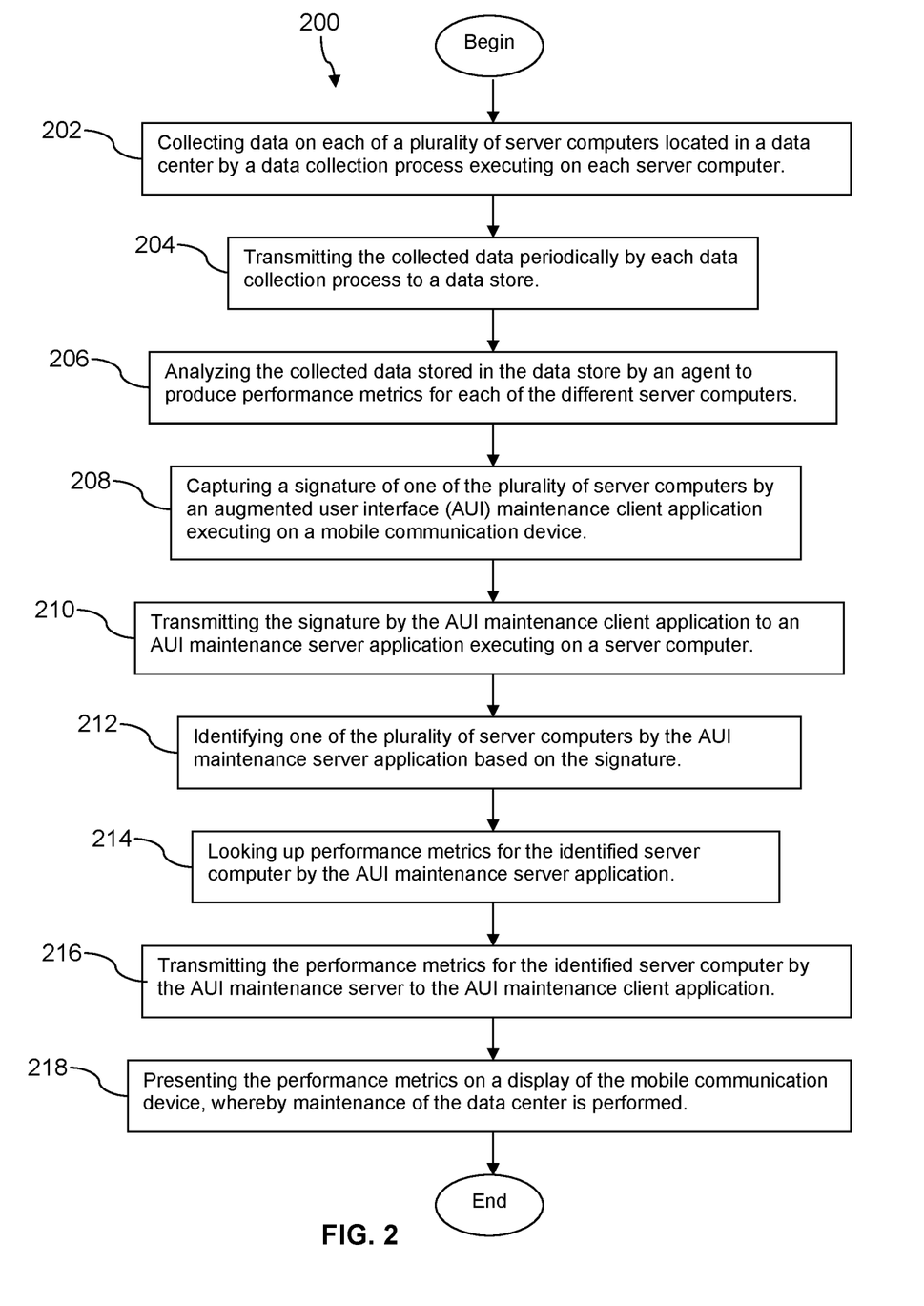
FIG. 2 is a flow chart of a method according to an embodiment of the disclosure.

Turning now to FIG. 2, a method 200 is described. In an embodiment, the method 200 is a method for maintaining a data center. At block 202, the method 200 comprises collecting data on each of a plurality of server computers located in a data center by a data collection process executing on each server computer. At block 204, the method 200 comprises transmitting the collected data periodically by each data collection process to a data store. In an embodiment, the data collected by the data collection process comprises performance information about the server computer on which the data collection process executes and performance information about at least one process executing on the server computer. The data may comprise one or more CPU utilization rate, one or more metrics of memory utilization, one or more metrics on data throughput. In an embodiment, the data collection process that executes on each server computer is a collected daemon process.

At block 206, the method 200 comprises analyzing the collected data stored in the data store by an agent to produce performance metrics for each of the different server computers. At block 208, the method 200 comprises capturing a signature of one of the plurality of server computers by an augmented user interface (AUI) maintenance client application executing on a mobile communication device. In an embodiment, the signature is one of a quick response (QR) code, a bar code, a two-dimensional bar code, a textual label, a radio frequency identity (RFID) chip, or a radio beacon. In an embodiment, the mobile communication device is one of a tablet computer, a notebook computer, a laptop computer, a mobile phone, a smart phone, a personal digital assistant (PDA), a wearable computer, or a headset computer.

At block 210, the method 200 comprises transmitting the signature by the AUI maintenance client application to an AUI maintenance server application executing on a server computer. At block 212, the method 200 comprises identifying one of the plurality of server computers by the AUI maintenance server application based on the signature. For example, the AUI maintenance server application uses the electronic representation of the signature as an index into a data structure that maps signatures to server computer identities to look up the identity of the server computer.

At block 214, the method 200 comprises looking up performance metrics for the identified server computer by the AUI maintenance server application. For example, the AUI maintenance server application uses the identity of the server computer as an index into the data store into which the agent wrote the performance metrics. At block 216, the method 200 comprises transmitting the performance metrics for the identified server computer by the AUI maintenance server to the AUI maintenance client application.

At block 218, the method 200 comprises presenting the performance metrics on a display of the mobile communication device, whereby maintenance of the data center is performed. The maintenance technician may use the presented information to confirm he or she has located the specific server computer they have been dispatched to maintain.

In an embodiment, the method 200 further comprises looking up alarms active on the identified server computer by the AUI maintenance server application in the data store, transmitting information about alarms active on the identified server computer by the AUI maintenance server application to the AUI maintenance client application, and presenting the information about alarms active on the identified server computer on the display of the mobile communication device. The method 200 may further comprise looking up a recommended remedial action based on an alarm active on the identified server computer by the AUI maintenance server application, transmitting procedural instructions associated with the remedial action by the AUI maintenance server application to the AUI maintenance client application, and presenting the procedural instructions on the display of the mobile communication device by the AUI maintenance client application, whereby a user of the mobile communication device is prompted to remedy an alarm active on the identified server computer. The method 200 may further comprise looking up a recommended remedial automated action based on an alarm active on the identified server computer by the AUI maintenance server application, transmitting an application programming interface (API) associated with the remedial automated action by the AUI maintenance server application to the AUI maintenance client application, and presenting a selection input control associated with the API on the display of the mobile communication device by the AUI maintenance client application, whereby a user of the mobile communication device is prompted to initiate the remedial automated action on the identified server computer. For example, if the user actuates the input control, the AUI maintenance client completes the API invocation, for example sending an API call back to the AUI maintenance server application or to an AI application executing on a computer.

In an embodiment, the method 200 further comprises looking up a configuration of record of the identified server computer by the AUI maintenance server application in a second data store and transmitting information about the configuration of record of the identified server computer by the AUI maintenance server application to the AUI maintenance client application. The method 200 may further comprise presenting an image of the identified server computer on a display of the mobile communication device by the AUI maintenance client application and presenting an augmented reality image of a configuration of record of the server computer superimposed over the image of the identified server computer on the display of the mobile communication device, whereby an actual configuration of the identified server computer can be compared to the configuration of record of the identified server computer. If the two images do not match, the maintenance technician may change the actual configuration of the server computer to match the configuration of record, for example by changing switch settings or removing a cable from a first port of the server computer and installing the cable into a second port of the server computer that is indicated by the configuration of record as the appropriate port to receive the cable.

Figure 3:
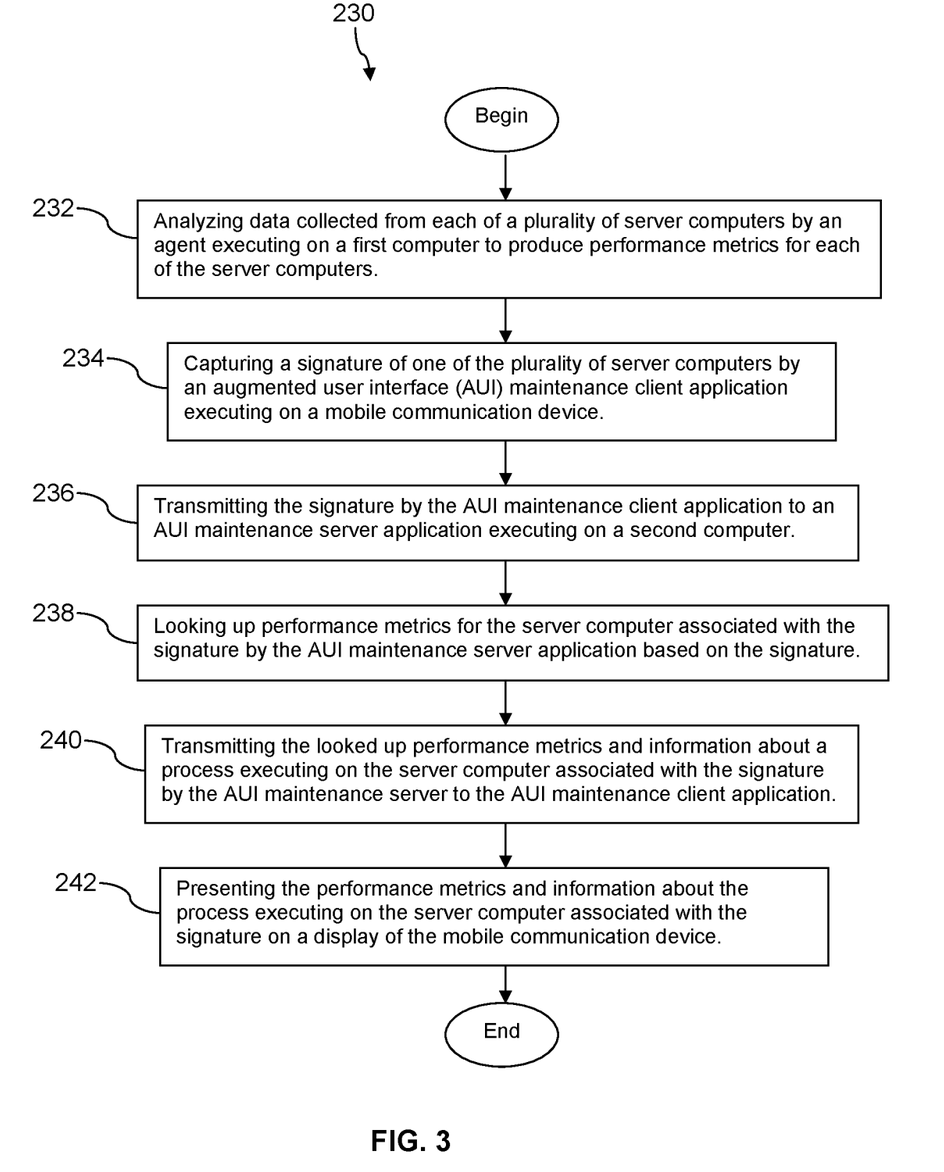
FIG. 3 is a flow chart of another method according to an embodiment of the disclosure.

Turning now to FIG. 3, a method 230 is described. In an embodiment, the method 230 is a method for maintaining server computers. At block 232, the method 230 comprises analyzing data collected from each of a plurality of server computers by an agent executing on a first computer to produce performance metrics for each of the server computers.

At block 234, the method 230 comprises capturing a signature of one of the plurality of server computers by an augmented user interface (AUI) maintenance client application executing on a mobile communication device. At block 236, the method 230 comprises transmitting the signature by the AUI maintenance client application to an AUI maintenance server application executing on a second computer.

At block 238, the method 230 comprises looking up performance metrics for the server computer associated with the signature by the AUI maintenance server application based on the signature. At block 240, the method 230 comprises transmitting the looked up performance metrics and information about a process executing on the server computer associated with the signature by the AUI maintenance server to the AUI maintenance client application.

At block 242, the method 230 comprises presenting the performance metrics and information about the process executing on the server computer associated with the signature on a display of the mobile communication device.

Figure 4:
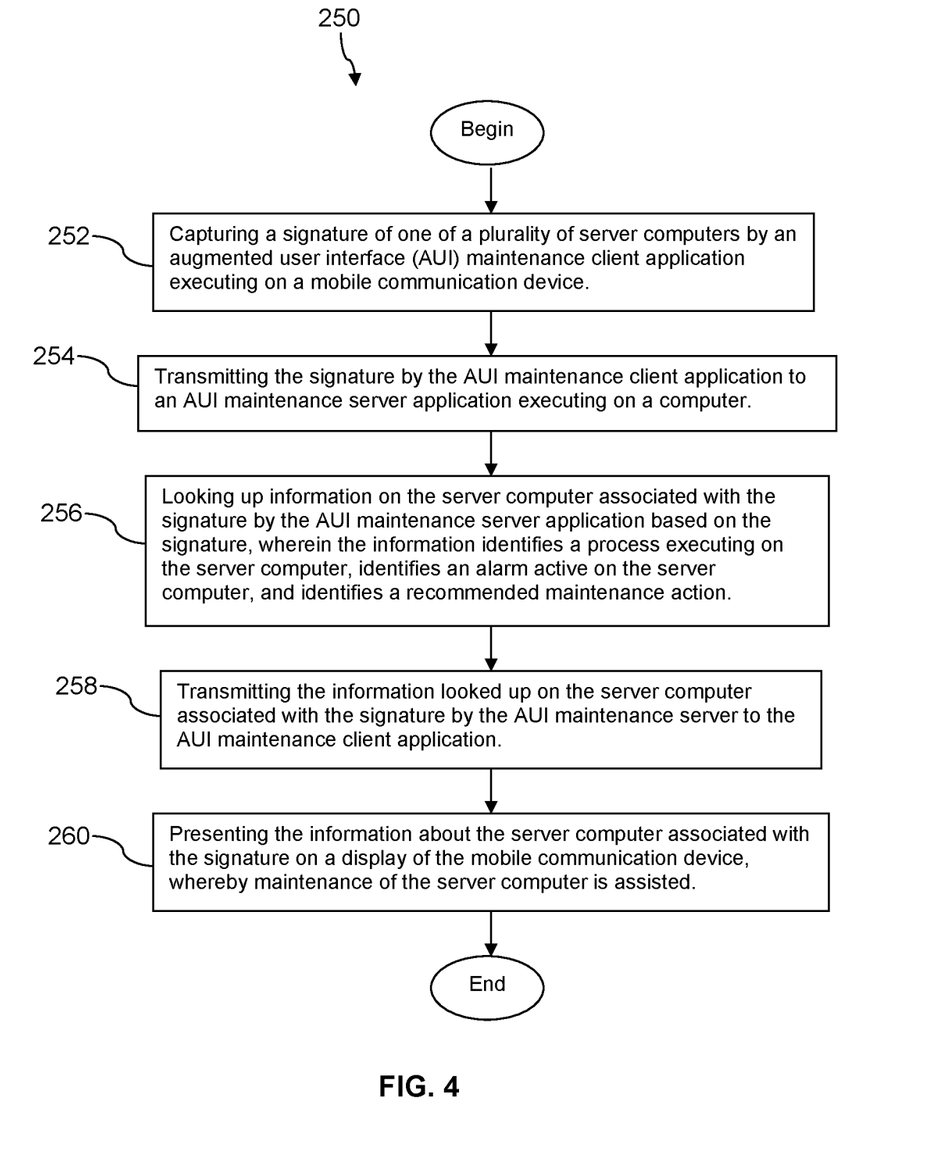
FIG. 4 is a flow chart of yet another method according to an embodiment of the disclosure.

Turning now to FIG. 4, a method 250 is described. In an embodiment, the method 250 is a method for maintaining server computers. At block 252, the method 250 comprises capturing a signature of one of a plurality of server computers by an augmented user interface (AUI) maintenance client application executing on a mobile communication device.

At block 254, the method 250 comprises transmitting the signature by the AUI maintenance client application to an AUI maintenance server application executing on a computer. At block 256, the method 250 comprises looking up information on the server computer associated with the signature by the AUI maintenance server application based on the signature, wherein the information identifies a process executing on the server computer, identifies an alarm active on the server computer, and identifies a recommended maintenance action.

At block 258 the method 250 comprises transmitting the information looked up on the server computer associated with the signature by the AUI maintenance server to the AUI maintenance client application. At block 260, the method 250 comprises presenting the information about the server computer associated with the signature on a display of the mobile communication device, whereby maintenance of the server computer is assisted.

Figure 5:
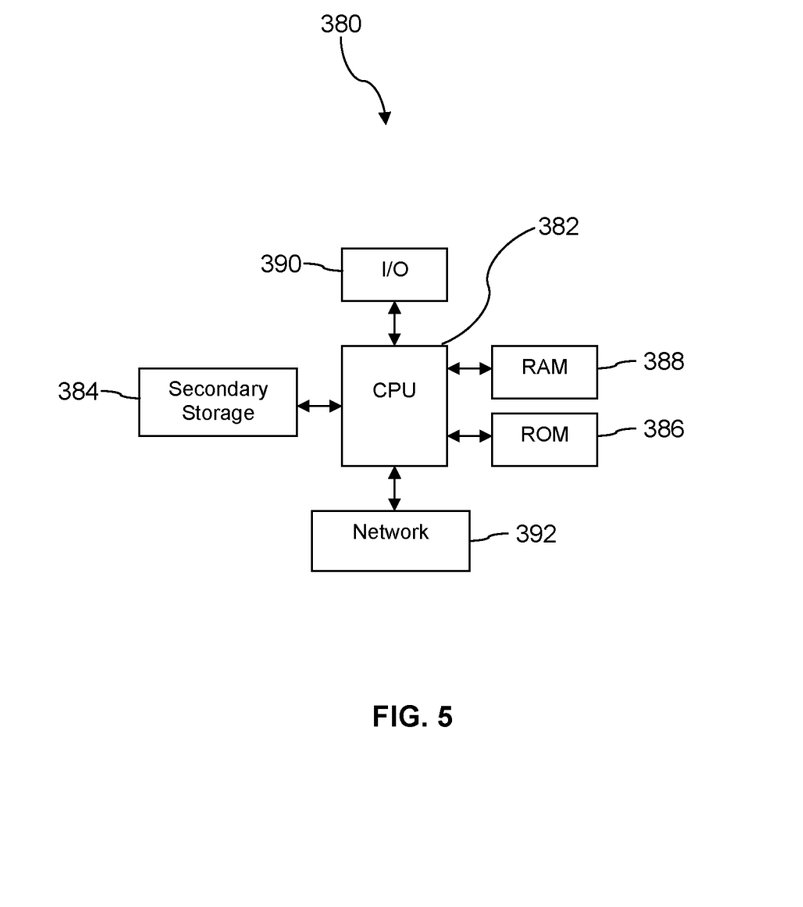
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the computer system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using the processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from a hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for maintaining a data center, comprising:

collecting data on each of a plurality of server computers located in a data center by a data collection process executing on each server computer;

transmitting the collected data periodically by each data collection process to a data store;

analyzing the collected data stored in the data store by an agent to produce a plurality of performance metrics for each of the different server computers;

capturing a signature of one of the plurality of server computers by an augmented user interface (AUI) maintenance client application executing on a mobile communication device;

transmitting the signature by the AUI maintenance client application to an AUI maintenance server application executing on a server computer;

identifying one of the plurality of server computers by the AUI maintenance server application based on the signature;

looking up one or more performance metrics of the plurality of performance metrics for the identified server computer by the AUI maintenance server application;

transmitting the one or more performance metrics for the identified server computer by the AUI maintenance server to the AUI maintenance client application;

presenting the one or more performance metrics on a display of the mobile communication device, whereby maintenance of the data center is performed;

receiving a selection of a control to project an image on the display showing a configuration of record of the identified server computer by the AUI maintenance client application;

in response to the selection, requesting information on the configuration of record of the identified server computer by the AUI maintenance client application from the AUI maintenance server;

looking up the configuration of record in a second data store using the signature as an index by the AUI maintenance server;

transmitting the configuration of record by the AUI maintenance server to the AUI maintenance client application; and presenting the image of the configuration of record on the display by the AUI client application.

2. The method of claim 1, wherein the mobile communication device is configured to be attached to, secured to, or suspended from a hat.

3. The method of claim 1, wherein the signature is one of a quick response (QR) code, a bar code, a two-dimensional bar code, a textual label, a radio frequency identity (RFID) chip, or a radio beacon.

4. The method of claim 1, further comprising looking up alarms active on the identified server computer by the AUI maintenance server application in the data store;

transmitting information about alarms active on the identified server computer by the AUI maintenance server application to the AUI maintenance client application; and presenting the information about alarms active on the identified server computer on the display of the mobile communication device.

5. The method of claim 4, further comprising:

looking up a recommended remedial action based on an alarm active on the identified server computer by the AUI maintenance server application;

transmitting procedural instructions associated with the remedial action by the AUI maintenance server application to the AUI maintenance client application; and presenting the procedural instructions on the display of the mobile communication device by the AUI maintenance client application, whereby a user of the mobile communication device is prompted to remedy an alarm active on the identified server computer.

6. The method of claim 4, further comprising:

looking up a recommended remedial automated action based on an alarm active on the identified server computer by the AUI maintenance server application;

transmitting an application programming interface (API) associated with the remedial automated action by the AUI maintenance server application to the AUI maintenance client application; and presenting a selection input control associated with the API on the display of the mobile communication device by the AUI maintenance client application, whereby a user of the mobile communication device is prompted to initiate the remedial automated action on the identified server computer.

7. The method of claim 1, wherein the data collected by the data collection process comprises performance information about the server computer on which the data collection process executes and performance information about at least one process executing on the server computer.

8. The method of claim 1, wherein each data collection process transmits collected data via a publish-subscribe message bus, and a second agent subscribes to receive the data and store the data in the data store.

9. The method of claim 1, wherein the data collection process is a collectd daemon process that executes on each server computer.

10. A method for maintaining server computers, comprising:

analyzing data collected from each of a plurality of server computers by an agent executing on a first computer to produce performance metrics for each of the server computers;

capturing a signature of one of the plurality of server computers by an augmented user interface (AUI) maintenance client application executing on a mobile communication device;

transmitting the signature by the AUI maintenance client application to an AUI maintenance server application executing on a second computer;

looking up, in a data store, performance metrics for the server computer associated with the signature and information about a process executing on the server computer associated with the signature by the AUI maintenance server application based on the signature;

transmitting the performance metrics and the information about the process executing on the server computer associated with the signature by the AUI maintenance server to the AUI maintenance client application;

presenting the performance metrics and the information about the process executing on the server computer associated with the signature on a display of the mobile communication device;

receiving a selection of a control to project an image on the display showing a configuration of record of the identified server computer by the AUI maintenance client application;

in response to the selection, requesting information on the configuration of record of the identified server computer by the AUI maintenance client application from the AUI maintenance server;

looking up the configuration of record in a second data store using the signature as an index by the AUI maintenance server;

transmitting the configuration of record by the AUI maintenance server to the AUI maintenance client application; and presenting the image of the configuration of record on the display by the AUI client application.

11. The method of claim 10, wherein the signature is one of a quick response (QR) code, a bar code, a two-dimensional bar code, a textual label, a radio frequency identity (RFID) chip, or a radio beacon.

12. The method of claim 10, further comprising:

looking up alarms active on the identified server computer by the AUI maintenance server application in the data store;

transmitting information about alarms active on the identified server computer by the AUI maintenance server application to the AUI maintenance client application; and presenting the information about alarms active on the identified server computer on the display of the mobile communication device.

13. The method of claim 10, wherein the data collected from each of the plurality of server computers are published on a publish-subscribe message bus, a second agent subscribes to receive the data and store the data in a data store, and the agent executing on the first computer reads the data from the data store.

14. A method for maintaining server computers, comprising:

capturing a signature of one of a plurality of server computers by an augmented user interface (AUI) maintenance client application executing on a mobile communication device;

transmitting the signature by the AUI maintenance client application to an AUI maintenance server application executing on a computer;

looking up, in a data store, information on the server computer associated with the signature by the AUI maintenance server application based on the signature, wherein the information identifies a process executing on the server computer, identifies an alarm active on the server computer, and identifies a recommended maintenance action;

transmitting the information looked up on the server computer associated with the signature by the AUI maintenance server to the AUI maintenance client application;

presenting the information about the server computer associated with the signature on a display of the mobile communication device, whereby maintenance of the server computer is assisted;

receiving a selection of a control to project an image on the display showing a configuration of record of the identified server computer by the AUI maintenance client application;

in response to the selection, requesting information on the configuration of record of the identified server computer by the AUI maintenance client application from the AUI maintenance server;

looking up the configuration of record in a second data store using the signature as an index by the AUI maintenance server;

transmitting the configuration of record by the AUI maintenance server to the AUI maintenance client application; and presenting the image of the configuration of record on the display by the AUI client application.

15. The method of claim 14, wherein the signature is one of a quick response (QR) code, a bar code, a two-dimensional bar code, a textual label, a radio frequency identity (RFID) chip, or a radio beacon.

16. The method of claim 14, further comprising:

looking up alarms active on the identified server computer by the AUI maintenance server application in the data store;

transmitting information about alarms active on the identified server computer by the AUI maintenance server application to the AUI maintenance client application; and presenting the information about alarms active on the identified server computer on the display of the mobile communication device.

17. The method of claim 16, further comprising:

looking up a recommended remedial action based on an alarm active on the identified server computer by the AUI maintenance server application;

transmitting procedural instructions associated with the remedial action by the AUI maintenance server application to the AUI maintenance client application; and presenting the procedural instructions on the display of the mobile communication device by the AUI maintenance client application, whereby a user of the mobile communication device is prompted to remedy an alarm active on the identified server computer.

18. The method of claim 16, further comprising:

looking up a recommended remedial automated action based on an alarm active on the identified server computer by the AUI maintenance server application;

transmitting an application programming interface (API) associated with the remedial automated action by the AUI maintenance server application to the AUI maintenance client application; and presenting a selection input control associated with the API on the display of the mobile communication device by the AUI maintenance client application, whereby a user of the mobile communication device is prompted to initiate the remedial automated action on the identified server computer.

19. The method of claim 1, wherein the configuration of record comprises at least one of cabling connections to the identified server computer or configuration switch positions.

20. The method of claim 1, wherein the image of the configuration of record is a transparent image of the configuration of record, and further comprising:

capturing an image of the identified server computer by the mobile communication device;

presenting the captured image on the display; and overlaying the transparent image of the configuration of record over the captured image of the identified server computer by the AUI maintenance client application such that an actual configuration of the identified server computer can be compared to the configuration of record.

* * * * *